United States Patent
Ueoka et al.

(10) Patent No.: US 8,412,427 B2
(45) Date of Patent: Apr. 2, 2013

(54) VEHICLE DRIVING APPARATUS, AND CONTROL METHODS THEREOF

(75) Inventors: Kiyoshiro Ueoka, Nissin (JP); Hiroki Tsutsumi, Nissin (JP); Yoichi Tajima, Anjo (JP); Takeshi Aoki, Nishio (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 478 days.

(21) Appl. No.: 12/672,727

(22) PCT Filed: Aug. 7, 2008

(86) PCT No.: PCT/JP2008/064231
§ 371 (c)(1),
(2), (4) Date: Feb. 9, 2010

(87) PCT Pub. No.: WO2009/022626
PCT Pub. Date: Feb. 19, 2009

(65) Prior Publication Data
US 2011/0213533 A1    Sep. 1, 2011

(30) Foreign Application Priority Data
Aug. 10, 2007   (JP) .................................. 2007-209137

(51) Int. Cl.
*G06F 17/00* (2006.01)

(52) U.S. Cl. ........... 701/66; 455/107; 455/109; 455/110

(58) Field of Classification Search .................. 477/107, 477/109, 110
See application file for complete search history.

(56) References Cited

U.S. PATENT DOCUMENTS

| | | | | |
|---|---|---|---|---|
| 4,754,828 A | * | 7/1988 | Morishita et al. | 180/446 |
| 2002/0049118 A1 | * | 4/2002 | Vornehm et al. | 477/107 |
| 2005/0107215 A1 | * | 5/2005 | Werner et al. | 477/174 |
| 2005/0159861 A1 | * | 7/2005 | Iwatsuki et al. | 701/22 |
| 2008/0070746 A1 | * | 3/2008 | Shiomi et al. | 477/43 |

FOREIGN PATENT DOCUMENTS

| | | |
|---|---|---|
| JP | 03-014736 A | 1/1991 |
| JP | 06-319210 A | 11/1994 |
| JP | 2004-203220 A | 7/2004 |
| JP | 2005-315358 A | 11/2005 |
| JP | 2006-056343 A | 3/2006 |
| JP | 2006-250111 A | 9/2006 |
| JP | 2007-131153 A | 5/2007 |

* cited by examiner

*Primary Examiner* — M. Thein
(74) *Attorney, Agent, or Firm* — Kenyon & Kenyon LLP

(57) ABSTRACT

When the change speed is instructed, without changing value of a suppressing vibration flag set to value 1 as initial value, a fast fill as the preparation of a brake to be engaged when the change speed is executed and low pressure standby of hydraulic pressure to set the brake in a half-engaged state. Then the suppressing vibration flag is set to value 0 when a predetermined time passed since the change speed is instructed, a sum of a drive torque required for driving and a suppressing vibration torque, which is in the same direction as suppressing rotational fluctuation of a drive shaft, is output from a motor when the suppressing vibration flag is set to value 1.

5 Claims, 9 Drawing Sheets

VEHICLE DRIVING APPARATUS, AND CONTROL METHODS THEREOF

This is a 371 national phase application of PCT/JP2008/064231 filed 7 Aug. 2008, claiming priority to Japanese Patent Application No. JP 2007-209137 filed 10 Aug. 2007, the contents of which are incorporated herein by reference.

TECHNICAL FIELD

The present invention relates to a vehicle, a driving apparatus, and their control methods.

BACKGROUND ART

One proposed structure of a vehicle includes an engine, a planetary gear of which a career is connected to an output shaft of the engine, a generator connected to a sun gear of the planetary gear, and a motor connected via a transmission to a ring gear of the planetary gear (see, for example, Patent Document 1). In this proposed vehicle, the output torque of the motor is maintained until the rotation speed of the motor is close to the rotation speed after changing gear in the transmission and then the output torque of the motor is smoothly changed into the torque after changing gear in the transmission when the gear change in the transmission is executed outputting the torque from the motor to an axel. This technique ensures the reduction of the torque shock caused when the gear ratio of the transmission is changed.

Patent Document 1: Japanese Patent Laid-Open No. 2006-56343

DISCLOSURE OF THE INVENTION

In the prior art vehicle, when the gear change in the transmission is not executed, control for suppressing vibration by outputting the suppressing vibration torque from the motor in the direction where rotational fluctuation can be suppressed is generally performed in order to suppress rotational fluctuation caused in the ring gear shaft functioning as the drive shaft due to the bumpy road. It is preferable that this control has been performed during gear change in the transmission. However, during the gear change in the transmission, especially during a torque phase which is period when a transmission of torque has been changed to a transmission in the change speed step after the gear change or during an inertia phase which is period when the rotation speed of the motor has been changed to the rotation speed corresponding to the change speed step after the gear change, torque fluctuation may be caused by outputting the suppressing vibration torque from the motor. In a transmission including hydraulic-driven clutches, it is necessary to prepare for a hydraulic circuit which drives the clutch before changing an engagement state of the clutch, thus some time is required from the instruction of a gear change to the start of the torque phase. During these preparation for the hydraulic circuit, the power from the motor is transmitted to the drive shaft at the gear ratio which is just before the instruction of the gear change, thus rotational fluctuation of the drive shaft can be suppressed by outputting the suppressing vibration torque from the motor. In the vehicle having a transmission including hydraulic-driven clutches, it is thus preferable that vibration induced rotational fluctuation of the drive shaft can be suppressed taking the state of the transmission in consideration.

In the vehicle, the driving apparatus, and their control methods, there would thus be a demand for ensuring suppressing of vibration induced rotational fluctuation of a drive shaft during changing a change speed step of transmission which can change a change speed step by changing an engagement state of hydraulic-driven clutches.

The present invention accomplishes at least part of the demands mentioned above and the other relevant demands by the following configurations applied to the vehicle, the driving apparatus, and their control methods.

According to one aspect, the invention is directed to a vehicle. The vehicle includes: a motor configured to input and output power; a change speed transmission mechanism connected with a rotating shaft of the motor and with a drive shaft connected with an axle, and configured to change speed and transmit power between the rotating shaft and the drive shaft with a changeover of a change speed step by changing an engagement state of a plurality of hydraulic-driven clutches; a driving force demand setting, module configured to set a driving force demand required for driving the vehicle; and controller configured to control the change speed transmission mechanism so as to change the change speed step into an instructed change speed step in response to an instruction to change the change speed step of the change speed transmission mechanism, the controller controlling the motor so as to output torque equivalent to sum of a drive torque based on the set driving force demand and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step, the controller controlling the motor so as to output the drive torque based on the set driving force demand without the suppressing vibration torque after the preset timing.

The vehicle according to this aspect of the invention controls the change speed transmission mechanism, which is connected with a rotating shaft of the motor and with a drive shaft connected with an axle and is configured to change speed and transmit power between the rotating shaft and the drive shaft with a changeover of a change speed step by changing an engagement state of a plurality of hydraulic-driven clutches, so as to change the change speed step into an instructed change speed step in response to an instruction to change the change speed step of the change speed transmission mechanism. The vehicle according to this aspect of the invention controls the motor so as to output torque equivalent to sum of a drive torque based on the set driving force demand and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step. In the change speed transmission mechanism, the clutches are hydraulic-driven clutches, thus some time is required from the instruction of the changeover of the change speed step to a start of a changeover of an engagement state of the clutches to be engaged after the end of the engagement preparation of the clutches. The vehicle according to this aspect of the invention controls the motor so as to output a quantity of torque equivalent to sum of the drive torque and the suppressing vibration torque at or before the preset timing at or after end of the engagement preparation of the clutches. This arrangement ensures the suppression of generation of the vibration caused by the rotational fluctuation of the drive shaft. The vehicle according to this aspect of the invention controls the motor so as to output the drive torque based on the set driving force demand without the suppressing vibration torque after the preset timing. When the engagement preparation of the clutches of a transmission completes, the output of a torque, which is set taken the suppressing vibration torque into consideration, from the motor may cause the rotational fluctuation in the drive shaft due to a start of the changeover of the engagement state of the clutches. The vehicle controls the motor so as to output the drive torque without the suppressing vibration torque after the preset timing. This arrangement prevents the motor from outputting the suppressing vibration torque when the suppressing vibration torque should not be output from the motor. Thus vibration induced rotational fluctuation of the drive shaft can be suppressed during changing the change speed step in the transmission. Here the terminology 'clutch' includes a conventional clutch for interconnecting two rotation systems, as well as a brake for fixing one rotation system to a non-rotation system, such as casing.

In one preferable embodiment of the vehicle of the invention, the preset timing is timing when a release of at least one of the plurality of clutches, that is changed from the engagement state to the release state during changing the change speed step to the instructed change speed step, is instructed. Before the preset timing, the clutches to be released is in the engagement state, the power from the motor is converted with a predetermined gear ratio and transmitted to the drive shaft by the change speed transmission mechanism. The motor outputs a quantity of torque equivalent to sum of the drive torque and the suppressing vibration torque, thus the rotational fluctuation of the drive shaft is suppressed and the generation of the vibration is suppressed. After the timing when a release of the clutch is instructed, the suppressing vibration torque sometimes should not be output from the motor. For example, during changing the state of the clutch from the engagement state to release state, the transmission is in the torque phase which is the phase of changing the transmission of the torque to the transmission of the torque in the change speed step after the changing the change speed step, and output of the suppressing vibration torque from the motor may cause rotational fluctuation of the drive shaft. The vehicle controls the motor so as to output the drive torque without the suppressing vibration torque after the preset timing. This arrangement prevents the motor from outputting the suppressing vibration torque when the suppressing vibration torque should not be output from the motor.

According to another aspect, the invention is directed to a driving apparatus driving a drive shaft. The driving apparatus includes: a motor configured to input and output power; a change speed transmission mechanism connected with a rotating shaft of the motor and with the drive shaft, and configured to change speed and transmit power between the rotating shaft and the drive shaft with a changeover of a change speed step by changing an engagement state of a plurality of hydraulic-driven clutches; and controller configured to control the change speed transmission mechanism so as to change the change speed step into an instructed change speed step in response to an instruction to change the change speed step of the change speed transmission mechanism, the controller controlling the motor so as to output torque equivalent to sum of a drive torque based on a driving force demand required for the drive shaft and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step, the controller controlling the motor so as to output the drive torque based on the set driving force demand without the suppressing vibration torque after the preset timing.

The driving apparatus according to this aspect of the invention controls the change speed transmission mechanism, which is connected with a rotating shaft of the motor and with the drive shaft and is configured to change speed and transmit power between the rotating shaft and the drive shaft with a changeover of a change speed step by changing an engagement state of a plurality of hydraulic-driven clutches, so as to change the change speed step into an instructed change speed step in response to an instruction to change the change speed step of the change speed transmission mechanism. The driving apparatus according to this aspect of the invention controls the motor so as to output torque equivalent to sum of a drive torque based on a driving force demand required for the drive shaft and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step. In the change speed transmission mechanism, the clutches are hydraulic-driven clutches, thus some time is required from the instruction of the changeover of the change speed step to a start of a changeover of an engagement state of the clutches to be engaged after the end of the engagement preparation of the clutches. The driving apparatus according to this aspect of the invention controls the motor so as to output a quantity of torque equivalent to sum of the drive torque and the suppressing vibration torque at or before the preset timing at or after end of the engagement preparation of the clutches. This arrangement ensures the suppression of generation of the vibration caused by the rotational fluctuation of the drive shaft. The driving apparatus according to this aspect of the invention controls the motor so as to output the drive torque based on the set driving force demand without the suppressing vibration torque after the preset timing. When the engagement preparation of the clutches of a transmission completes, the output of a torque, which is set taken the suppressing vibration torque into consideration, from the motor may cause the rotational fluctuation in the drive shaft due to a start of the changeover of the engagement state of the clutches. The driving apparatus controls the motor so as to output the drive torque without the suppressing vibration torque after the preset timing. This arrangement prevents the motor from outputting the suppressing vibration torque when the suppressing vibration torque should not be output from the motor. Thus vibration induced rotational fluctuation of the drive shaft can be suppressed during changing the change speed step in the transmission. Here the terminology 'clutch' includes a conventional clutch for interconnecting two rotation systems, as well as a brake for fixing one rotation system to a non-rotation system, such as casing.

According to another aspect, the invention is directed to a control method of a vehicle. The vehicle includes a motor configured to input and output power; a change speed transmission mechanism connected with a rotating shaft of the motor and with the drive shaft connected with an axle, and configured to change speed and transmit power between the rotating shaft and the drive shaft with a changeover of a change speed step by changing an engagement state of a plurality of hydraulic-driven clutches. The method includes the steps of: setting a driving force demand required for driving the vehicle; and controlling the change speed transmission mechanism so as to change the change speed step into an instructed change speed step in response to an instruction to change the change speed step of the change speed transmission mechanism, controlling the motor so as to output torque equivalent to sum of a drive torque based on the set driving force demand and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step, and controlling the motor so as to output the drive torque based on the set driving force demand without the suppressing vibration torque after the preset timing.

The control method of the vehicle according to this aspect of the invention controls the change speed transmission mechanism, which is connected with a rotating shaft of the motor and with a drive shaft connected with an axle and is configured to change speed and transmit power between the rotating shaft and the drive shaft with a changeover of a change speed step by changing an engagement state of a plurality of hydraulic-driven clutches, so as to change the change speed step into an instructed change speed step in response to an instruction to change the change speed step of the change speed transmission mechanism. The control method of the vehicle according to this aspect of the invention controls the motor so as to output torque equivalent to sum of a drive torque based on the set driving force demand and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step. In the change speed transmission mechanism, the clutches is hydraulic-driven clutches, thus some time is required from the instruction of the changeover of the change speed step to a start of a changeover of an engagement state of the clutches to be engaged after the end of the engagement preparation of the clutches. The control method of the vehicle according to this aspect of the invention controls the motor so as to output a quantity of torque equivalent to sum of the drive torque and the suppressing vibration torque at or before the preset timing at or after end of the engagement preparation of the clutches. This arrangement ensures the suppression of generation of the vibration caused by the rotational fluctuation of the drive shaft. The control method of the vehicle according to this aspect of the invention controls the motor so as to output the drive torque based on the set driving force demand without the suppressing vibration torque after the preset timing. When the engagement preparation of the clutches of a transmission completes, the output of a torque, which is set taken the suppressing vibration torque into consideration, from the motor may cause the rotational fluctuation in the drive shaft due to a start of the changeover of the engagement state of the clutches. The control method of the vehicle controls the motor so as to output the drive torque without the suppressing vibration torque after the preset timing. This arrangement prevents the motor from outputting the suppressing vibration torque when the suppressing vibration torque should not be output from the motor. Thus vibration induced rotational fluctuation of the drive shaft can be suppressed during changing the change speed step in the transmission. Here the terminology 'clutch' includes a conventional clutch for interconnecting two rotation systems, as well as a brake for fixing one rotation system to a non-rotation system, such as casing.

According to still another aspect, the invention is directed to a control method of a driving apparatus mounted on a vehicle and driving a drive shaft. The driving apparatus includes a motor configured to input and output power, and a change speed transmission mechanism connected with a rotating shaft of the motor and with the drive shaft, and configured to change speed and transmit power between the rotating shaft and the drive shaft with a changeover of a change speed step by changing an engagement state of a plurality of hydraulic-driven clutches. The method includes the step of: controlling the change speed transmission mechanism so as to change the change speed step into an instructed change speed step in response to an instruction to change the change speed step of the change speed transmission mechanism, controlling the motor so as to output torque equivalent to sum of a drive torque based on a driving force demand required for the drive shaft and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step, and controlling the motor so as to output the drive torque based on the set driving force demand without the suppressing vibration torque after the preset timing.

The control method of the driving apparatus according to this aspect of the invention controls the change speed transmission mechanism, which is connected with a rotating shaft of the motor and with the drive shaft and is configured to change speed and transmit power between the rotating shaft and the drive shaft with a changeover of a change speed step by changing an engagement state of a plurality of hydraulic-driven clutches, so as to change the change speed step into an instructed change speed step in response to an instruction to change the change speed step of the change speed transmission mechanism. The control method of the driving apparatus according to this aspect of the invention controls the motor so as to output torque equivalent to sum of a drive torque based on a driving force demand required for the drive shaft and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step. In the change speed transmission mechanism, the clutches are hydraulic-driven clutches, thus some time is required from the instruction of the changeover of the change speed step to a start of a changeover of an engagement state of the clutches to be engaged after the end of the engagement preparation of the clutches. The control method of the driving apparatus according to this aspect of the invention controls the motor so as to output a quantity of torque equivalent to sum of the drive torque and the suppressing vibration torque at or before the preset timing at or after end of the engagement preparation of the clutches. This arrangement ensures the suppression of generation of the vibration caused by the rotational fluctuation of the drive shaft. The control method of the driving apparatus according to this aspect of the invention controls the motor so as to output the drive torque based on the set driving force demand without the suppressing vibration torque after the preset timing. When the engagement preparation of the clutches of a transmission completes, the output of a torque, which is set taken the suppressing vibration torque into consideration, from the motor may cause the rotational fluctuation in the drive shaft due to a start of the changeover of the engagement state of the clutches. The control method of the driving apparatus controls the motor so as to output the drive torque without the suppressing vibration torque after the preset timing. This arrangement prevents the motor from outputting the suppressing vibration torque when the suppressing vibration torque should not be output from the motor. Thus vibration induced rotational fluctuation of the drive shaft can be suppressed during changing the change speed step in the transmission. Here the terminology 'clutch' includes a conventional clutch for interconnecting two rotation systems, as well as a brake for fixing one rotation system to a non-rotation system, such as casing.

BEST MODES OF CARRYING OUT THE INVENTION

Figure 1:
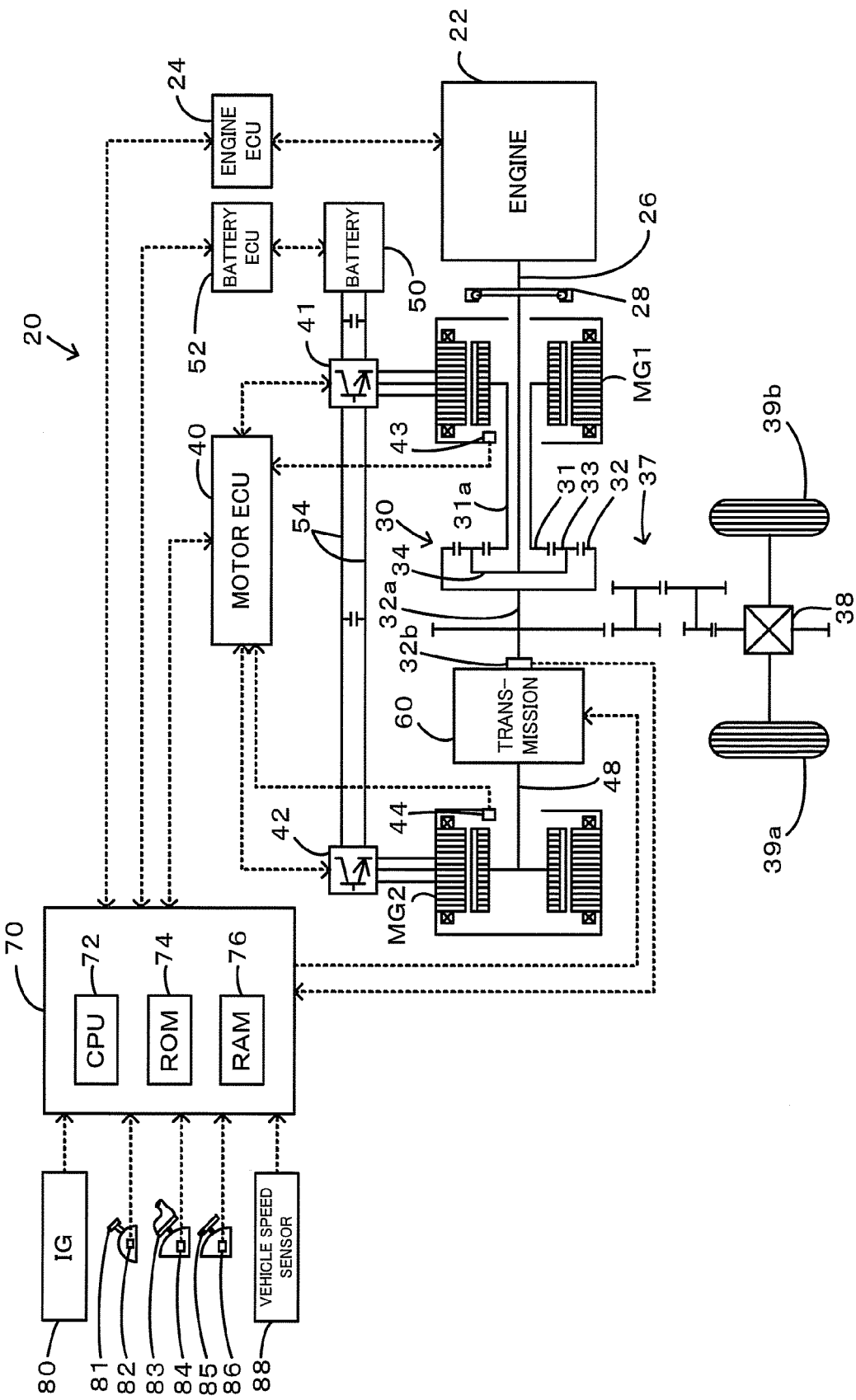
FIG. 1 schematically illustrates the configuration of a hybrid vehicle 20 in one embodiment according to the invention.

One mode of carrying out the invention is discussed below as a preferred embodiment. FIG. 1 schematically illustrates the construction of a hybrid vehicle 20 in one embodiment of the invention. As illustrated, the hybrid vehicle 20 of the embodiment includes an engine 22, a three shaft-type power distribution and integration mechanism 30 that is linked with a crankshaft 26 functioning as an output shaft of the engine 22 via a damper 28, a motor MG1 that is linked with the power distribution and integration mechanism 30 and is capable of generating electric power, another motor MG2 that is linked with the three shaft-type power distribution and integration mechanism 30 via a transmission 60, and a hybrid electronic control unit 70 that controls the whole drive system of the vehicle.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the motor MG2 via the transmission 60. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The ring gear 32 is mechanically coupled with driving wheels 39a and 39b which are front wheels of vehicle via a gear mechanism 37 and a differential gear 38. The power output to the ring gear 32 is thus finally transmitted to the driving wheels 39a and 39b via the gear mechanism 37, and the differential gear 38. When seeing as a driving system, the crankshaft 26 which is coupled with the carrier 34 and is the output shaft of the engine 22, a sun gear shaft 31a which is coupled with the sun gear 31 and is a rotating shaft of the motor MG1, and a ring gear shaft 32a as the drive shaft which is coupled with the ring gear 32 and is mechanically coupled with the driving wheels 39a and 39b are the three shafts coupled with the power distribution and integration mechanism 30.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 computes rotation speeds Nm1 and Nm2 of the motors MG1 and MG2 from the input signals from the rotational position detection sensors 43 and 44.

Figure 2:
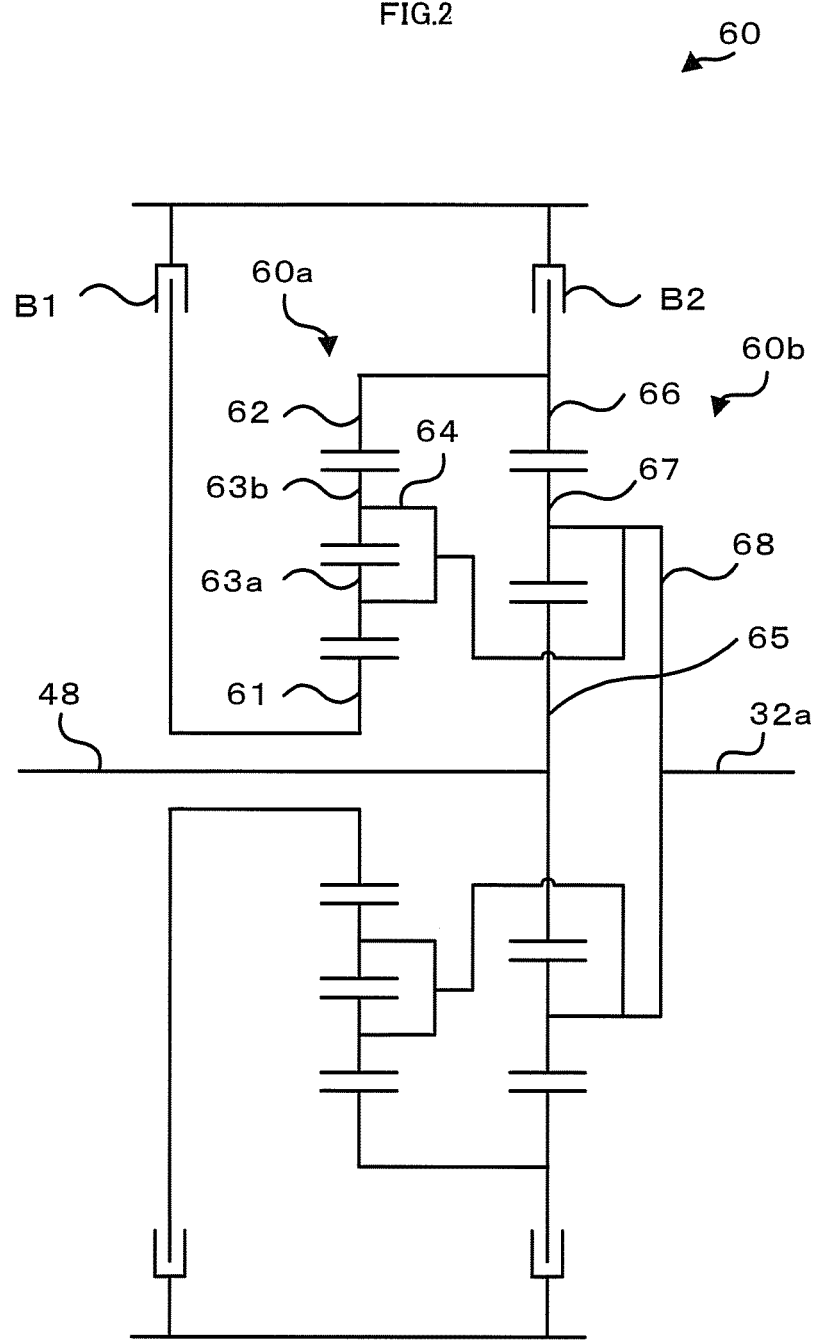
FIG. 2 illustrates the structure of a transmission 60.

The transmission 60 is designed to connect and disconnect a rotating shaft 48 of the motor MG2 with and from a ring gear shaft 32a. In the connection state, the transmission 60 reduces the rotation speed of the rotating shaft 48 of the motor MG2 at two different steps and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gears 63a engaging with the sun gear 61, multiple second pinion gears 63b engaging with the multiple first pinion gears 63a and with the ring gear 62, and a carrier 64 holding the multiple first pinion gears 63a coupled with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a.

Figure 3:
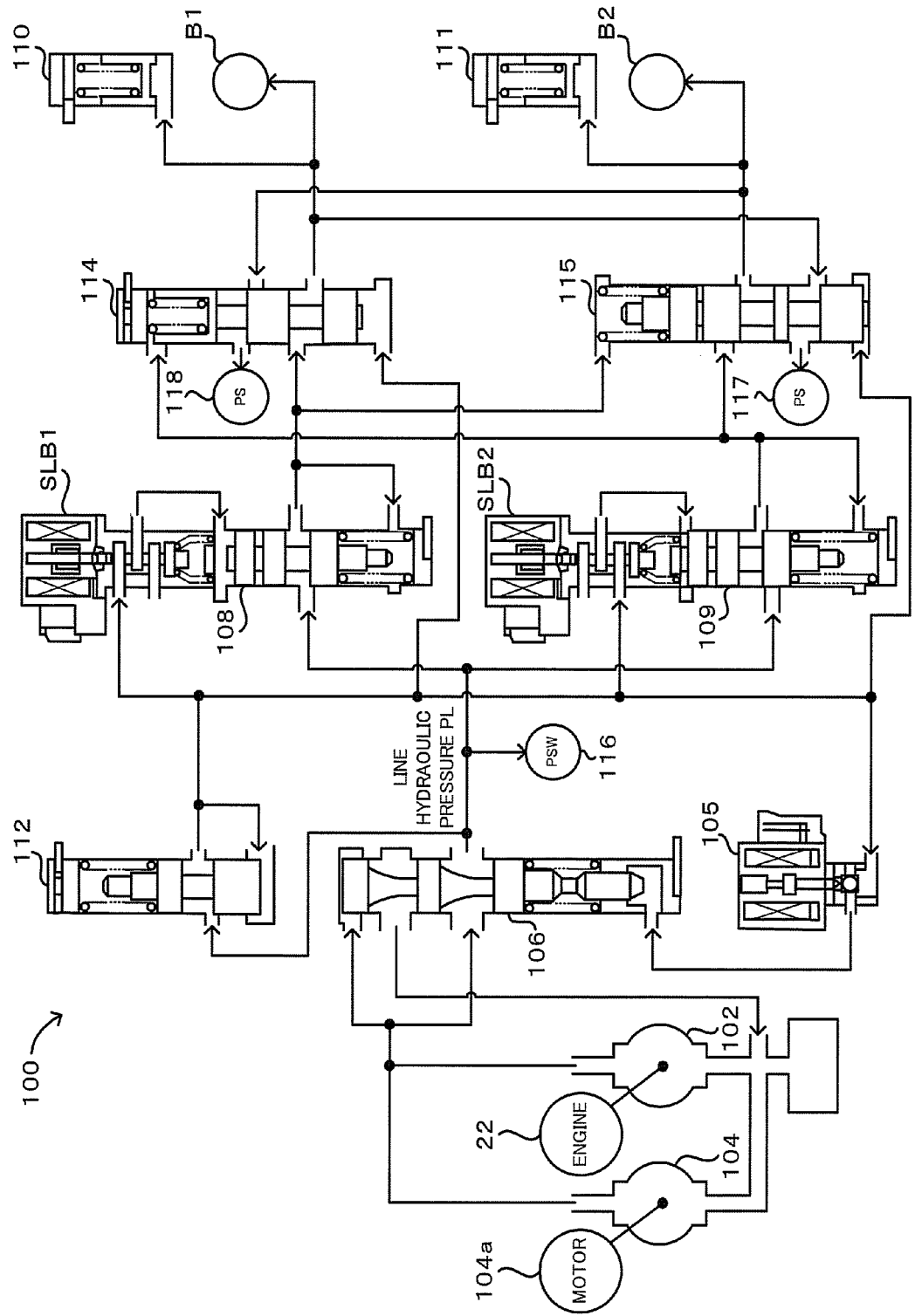
FIG. 3 illustrates the structure of a hydraulic circuit 100 of the transmission 60.

The brakes B1 and B2 are designed as multiplate brake which is engaged or released by friction induced by several plate-like friction devices. The brakes B1 and B2 are engaged or released by injecting oil from a hydraulic circuit 100 shown in FIG. 3 into each cylinder of the brakes B1 and B2, which is corresponding to the brakes B1 and B2 in FIG. 3, to make hydraulic pressure from the hydraulic circuit 100 act on pistons (not shown) and pressing the friction devices by the pistons. As illustrated, the hydraulic circuit 100 includes a mechanical pump 102 compressing and sending oil by the power output from the engine 22, an electric pump 104 compressing and sending oil by the power output from a built-in motor 104a, a 3-way solenoid 105 and a pressure control valve 106 working in combination to switch the height of hydraulic pressure (a line hydraulic pressure PL) from the mechanical pump 102 or the electric pump 104 by two steps, linear solenoids SLB1 and SLB2, control valves 108 and 109, and accumulators 110 and 111 working in combination to regulate the line hydraulic pressure PL and make the line hydraulic pressure PL act on the cylinders of the brakes B1 and B2, a modulator valve 112 reducing the line hydraulic pressure and supplying the line hydraulic pressure PL with each input port of the 3-way solenoid 105, linear solenoids SLB1 and SLB2, a fail safe valves 114 opening a oil passage between the control valve 108 and the brake B1 when the pressure of the oil transmitted from the control valve 109 on the brake B2 is less than a prescribed pressure and automatically closing the oil passage between the control valve 108 and the brake B1 when the pressure of the oil transmitted from the control valve 109 on the brake B2 is more than the prescribed pressure, and a fail safe valves 115 opening a oil passage between the control valve 109 and the brake B2 when the pressure of the oil transmitted from the control valve 108 on the brake B1 is less than a prescribed pressure and automatically closing the oil passage between the control valve 109 and the brake B2 when the pressure of the oil transmitted from the control valve 108 on the brake B1 is more than the prescribed pressure. In the embodiment, the control valve 108 closes when the linear solenoid SLB1 is turned on electricity and opens when the linear solenoid SLB1 is turned off electricity. The control valve 108 and the linear solenoid SLB1 are constructed like that. The control valve 109 also opens when the linear solenoid SLB2 is turned on electricity and closes when the linear solenoid SLB2 is turned off electricity. The control valve 109 and the linear solenoid SLB2 are constructed like that. So the brake B1 is engaged and the brake B2 is released when the linear solenoids SLB1 and SLB2 are turned off with the line pressure acted, and the combination of the engaged brake B1 and the released brake B2 can put the transmission 60 into Hi gear position. Moreover, the brake B1 is released and the brake 32 is engaged when the linear solenoids SLB1 and SLB2 are turned on with the line pressure acted, and the combination of the released brake B1 and the engaged brake B2 can put the transmission 60 into Lo gear position.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50 based on the accumulated charge-discharge current measured by the current sensor for control of the battery 50, an input limit Win which is maximum allowed power for charging the battery 50 based on the calculated state of charge (SOC) and a battery temperature Tb, and an output limit Wout which is maximum allowed power for discharging the battery 50 based on the calculated state of charge (SOC) and the battery temperature Tb. The input limit Win and the output limit Wout of the battery 50 can be respectively set by multiplying the basic values of the input limit Win and the output limit Wout by the modification coefficients for the input limit and the output limit which are respectively set based on the state of charge (SOC) of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, a drive shaft rotation speed Nr from a rotation sensor 32b that is attached to the ring gear shaft 32a as the drive shaft, a hydraulic pressure Po from a hydraulic pressure sensor 116 that detects the line hydraulic pressure in the hydraulic circuit 100, and hydraulic pressures Po1 and Po2 from hydraulic pressure sensors 117 and 118 that detects hydraulic pressures acting on the brakes B1 and B2. The hybrid electronic control unit 70 sends various outputs via the output port: a drive signal to a non-illustrated actuator of the brakes B1 and B2 in the transmission 60. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution and integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution and integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
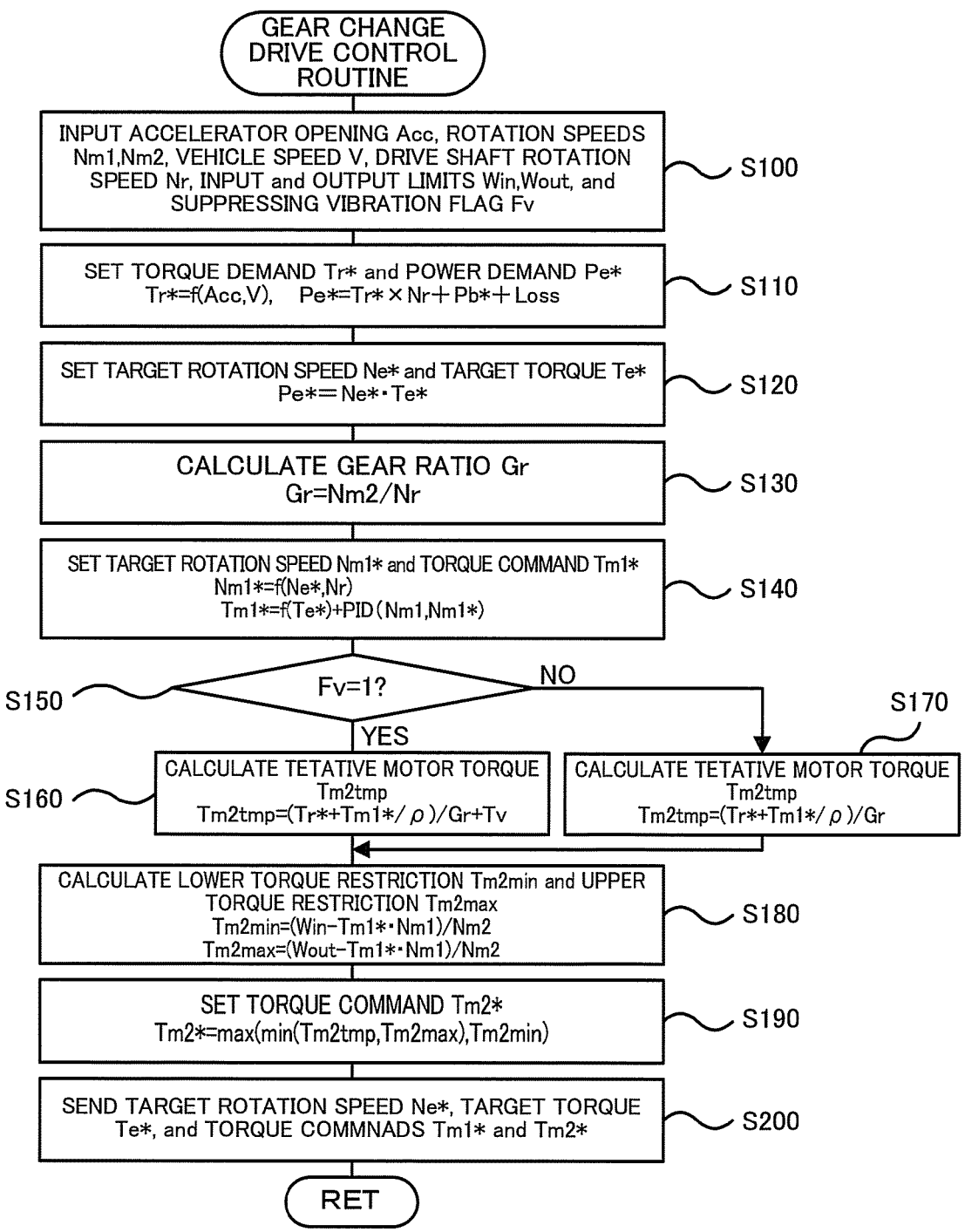
FIG. 4 is a flowchart showing a gear change drive control routine executed by a hybrid electronic control unit 70 in the embodiment.

The following describes the operations of the hybrid vehicle 20 of the embodiment having the configuration discussed above, especially a series of operations to perform a Lo-Hi gear change to change the state of the transmission 60 from Lo gear position, which releases the brake B1 and engages the brake B2, to Hi gear position, which engage the brake B1 and release the brake B2. FIG. 4 is a flowchart showing a gear change drive control routine executed by the hybrid electronic control unit 70 in the embodiment. This routine is performed repeatedly at preset time intervals (for example, at every several msec) when the performance of the Lo-Hi gear change is identified. The identification of the Lo-Hi gear change is based on the vehicle speed V and the torque demand to be demanded to the vehicle, and the Lo-Hi gear change in the transmission 60 is performed when the vehicle speed V increases to exceed a Lo-Hi gear change line in a predetermined gear change map with the transmission 60 made Lo gear position.

In the gear change drive control routine, the CPU 72 of the hybrid electronic control unit 70 inputs various data required for control, for example, the accelerator opening Acc from the accelerator pedal position sensor 84, the vehicle speed V from the vehicle speed sensor 88, rotation speeds Nm1 and Nm2 of the motors MG1 and MG2, the input limit Win and the output limit Wout of the battery 50, the drive shaft rotation speed Nr from the rotation sensor 32b, a suppressing vibration flag Fv (step S100). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The input limit Win and the output limit Wout of the battery 50 are set based on a battery temperature Tb and the state of charge (SOC) of the battery 50 and are input from the battery ECU 52 by communication. The suppressing vibration flag Fv is set in a Lo-Hi gear change routine, as it described below, executed concurrently with the gear change drive control routine. The suppressing vibration flag Fv is set to 1 when it is determined that the rotational fluctuation caused in the ring gear shaft 32a functioning as the drive shaft can be suppressed by outputting the suppressing vibration torque from the motor MG2 and is set to 0 when it is determined that the rotational fluctuation caused in the ring gear shaft 32a cannot be suppressed by outputting the suppressing vibration torque from the motor MG2. The suppressing vibration flag Fv is set default value at 1.

Figure 5:
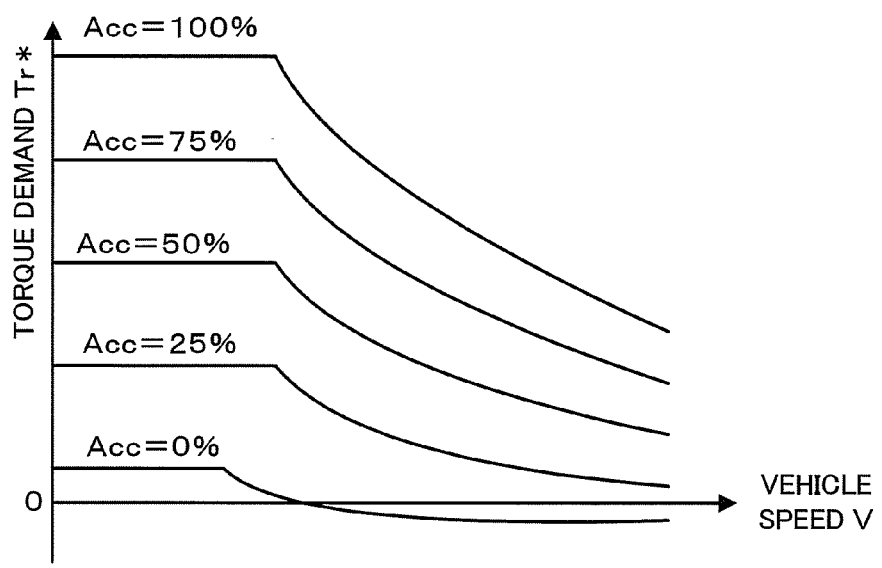
FIG. 5 shows one example of a torque demand setting map.

After the data input, the CPU 72 sets a torque demand Tr* to be output to the ring gear shaft 32a or the driveshaft linked with the drive wheels 39a and 39b as a torque required for the hybrid vehicle 20 and a power demand Pe* required for the engine 22, based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 5. The power demand Pe* is calculated as the sum of the product of the set torque demand Tr* and the drive shaft rotation speed Nr of the ring gear shaft 32a, the charge-discharge power demand Pb*, and a potential loss Loss.

Figure 6:
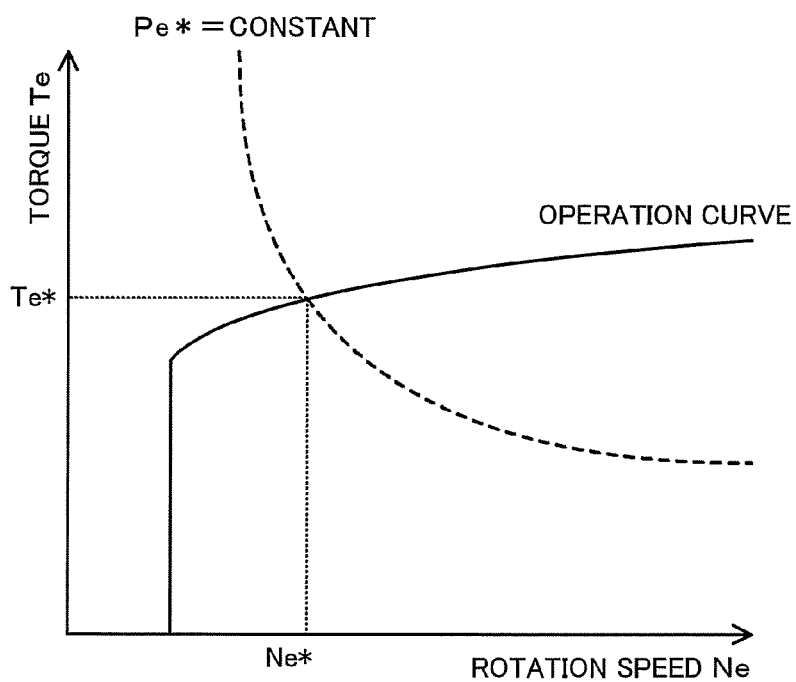
FIG. 6 shows an operation curve of an engine 22 used to set a target rotation speed Ne* and a target torque Te*.

A target rotation speed Ne* and a target torque Te* of the engine 22 are set, based on the set power demand Pe* (step S120). In this embodiment, the target rotation speed Ne* and the target torque Te* are determined according to an operation curve of ensuring efficient operation of the engine 22 and a curve of the power demand Pe*. FIG. 6 shows an operation curve of the engine 22 used to set the target rotation speed Ne* and the target torque Te* of the engine 22. As clearly shown in FIG. 6, the target rotation speed Ne* and the target torque Te* are given as an intersection of the operation curve and a curve of constant power demand Pe* (=Ne*×Te*).

The CPU 72 subsequently calculates a gear ratio Gr of the transmission 60 obtained by dividing the rotation speed Nm2 of the motor MG2 by the drive shaft rotation speed Nr (step S130) and then calculates a target rotation speed Nm1* of the motor MG1 from the set target rotation speed Ne* of the engine 22, the drive shaft rotation speed Nr, and a gear ratio ρ of the power distribution and integration mechanism 30 according to Equation (1) given below, while calculating a torque command Tm1* of the motor MG1 from the calculated target rotation speed Nm1* and the input rotation speed Nm1 of the motor MG1 according to Equation (2) given below (step S140).

$$Nm1^* = Ne^* \cdot (1+\rho)/\rho - Nr/\rho \quad (1)$$

$$Tm1^* = \rho \cdot Te^*/(1+\rho) + k1(Nm1^* - Nm1) + k2\int(Nm1^* - Nm1)dt \quad (2)$$

Figure 7:
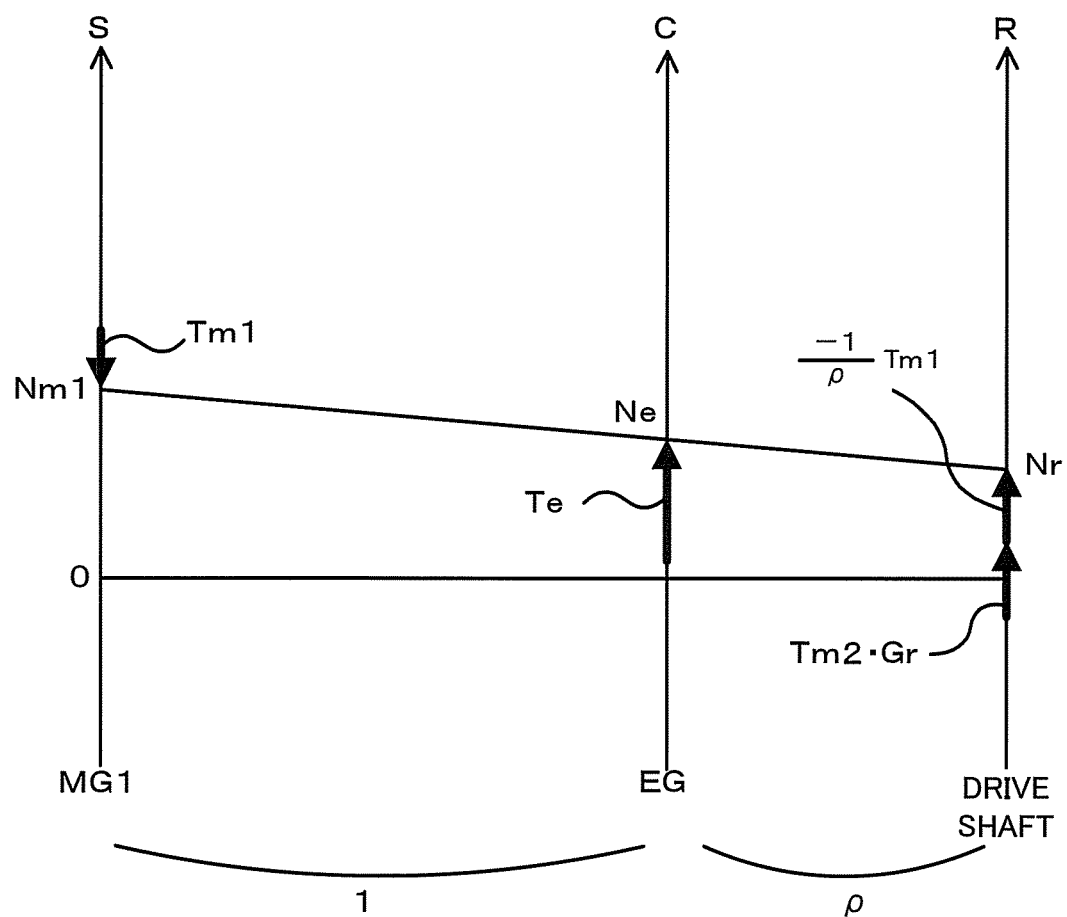
FIG. 7 is an alignment chart showing torque-rotation speed dynamics of respective rotational elements included in a power distribution and integration mechanism 30.

Equation (1) is a dynamic relational expression of respective rotational elements included in the power distribution and integration mechanism 30. FIG. 7 is an alignment chart showing torque-rotation speed dynamics of the respective rotational elements included in the power distribution and integration mechanism 30 during driving outputting the power from the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 (the drive shaft rotation speed Nr). Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the transmission 60 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional term and a gain of the integral term.

The CPU 72 subsequently identifies the value of the suppressing vibration flag Fv (step S150). When the identified value of the suppressing vibration flag Fv is 1, the CPU 72 calculates a tentative motor torque Tm2tmp to be output from the motor MG2 by adding a drive torque to a suppressing vibration torque according to Equation (3) given below (step S160). The drive torque is calculated by dividing a torque, which is obtained by adding what is calculated by dividing the set target motor torque Tm1* by the gear ratio ρ of the power distribution and integration mechanism 30 to the set torque demand Tr*, by the gear ratio Gr of the transmission 60. The suppressing vibration torque is calculated by dividing a suppressing torque Tv in the direction where rotational fluctuation in the ring gear shaft 32a as the drive shaft can be suppressed by the gear ratio Gr of the transmission 60.

$$Tm2tmp = (Tr^* + Tm1^*/\rho)/Gr + Tv/Gr \quad (3)$$

In Equation (3) given above, the drive torque in the first term on the right side is readily introduced from the alignment chart of FIG. 7. The suppressing torque Tv in this embodiment is set the one calculated as a torque easing fluctuation component (Δdω) of a rotation angular acceleration dω of the rotation speed Nm2 of the motor MG2 according to Equation (4) given below.

$$Tv = -k3 \cdot \Delta d\omega \quad (4)$$

Equation (4) is a relational expression of feedback control to ease the fluctuation component (Δdω) of the rotation angular acceleration dω of the motor MG2 calculated based on the signal from rotational position detection sensor 44 that detect the rotational positions of the rotor in the motors MG2. In Equation (4) given above, 'k3' on the right side denote a gain of the proportional term. A torque easing fluctuation component (Δdω) of the rotation angular acceleration of the rotation speed Nm2 of the motor MG2 is used as the suppressing torque Tv in this embodiment. One modified procedure may use various torque obtained by various methods, for example, the torque which is filtered so as to ease only frequency component of resonance contributing to vibration in the vehicle of the rotation angular acceleration. The frequency component of resonance corresponds from 400 rpm to 500 rpm as resonance rotation speed belt.

After setting the tentative motor torque Tm2tmp, a lower torque restriction Tm2min and an upper torque restriction Tm2max as allowable minimum and maximum torques output from the motor MG2 are calculated by dividing respective differences between the input limit Win or the output limit Wout of the battery 50 and power consumption (power generation) of the motor MG1, which is the product of the set torque command Tm1* and the current rotation speed Nm1 of the motor MG1, by the current rotation speed Nm2 of the motor MG2 according to Equations (5) and (6) given below (step S180).

$$Tm2min = (Win - Tm1^* \cdot Nm1)/Nm2 \quad (5)$$

$$Tm2max = (Wout - Tm1^* \cdot Nm1)/Nm2 \quad (6)$$

The CPU 72 limits the tentative motor torque Tm2tmp to the range between the calculated lower torque restriction Tm2min and upper torque restriction Tm2max to set a torque command Tm2* of the motor MG2 according to Equation (7) given below (step S190).

$$Tm2^* = \max(\min(Tm2tmp, Tm2max), Tm2min) \quad (7)$$

When the identified value of the suppressing vibration flag Fv is 1, setting the torque command Tm2* of the motor MG2 so as to output a torque based on the torque calculated by adding the drive torque to the suppressing vibration torque from the motor MG2 in this manner ensures outputting of a torque based on the torque demand Tr* to the ring gear shaft 32a as the drive shaft and ensures suppression of the vibration by suppressing the rotational fluctuation of the ring gear shaft 32a as the drive shaft.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and sends the torque commands Tm1* and Tm2* of the motors MG1 and MG2 to the motor ECU 40 (step S200) and exits from the drive control routine. The engine ECU 24 receives the settings of the target rotation speed Ne* and the target torque Te* and performs required controls of the engine 22, such as intake air flow control, fuel injection control and ignition control, to drive the engine 22 at a specific drive point defined by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. This control ensures the suppression of generation of the vibration caused by the rotational fluctuation of the ring gear shaft 32a when the identified value of the suppressing vibration flag Fv is 1. This control ensures efficient operation of the engine 22 and driving outputting the torque based on the torque demand Tr* to the ring gear shaft 32a as the drive shafts in the range of the input limit Win and the output limit Wout of the battery 50.

When the identified value of the suppressing vibration flag Fv is 0 (step S150), the CPU 72 calculates the tentative motor torque Tm2tmp to be output from the motor MG2 as the drive torque calculated by dividing a torque, which is obtained by adding what is calculated by dividing the set torque command Tm1* by the gear ratio ρ of the power distribution and integration mechanism 30 to the set torque demand Tr*, by the gear ratio Gr of the transmission 60, according to Equation (8) given below (step S170), sets the torque command Tm2* of the motor MG2 to what is obtained by limiting the calculated tentative motor torque Tm2tmp to the range between the lower torque restriction Tm2min and upper torque restriction Tm2max (step S180,S190), sends the target rotation speed Ne* and the target torque Te* of the engine 22 to the engine ECU 24 and the torque commands Tm1* and Tm2* of the motors MG1 and MG2 to the motor ECU 40 (step S200) and exits from this routine.

$$Tm2tmp=(Tr^{*}+Tm1^{*}/\rho)/Gr \quad (8)$$

Equation (8) is readily introduced from the alignment chart of FIG. 7. When the identified value of the suppressing vibration flag Fv is 0, the torque command Tm2* of the motor MG2 is set based on the drive torque without considering the suppressing vibration torque and the engine 22 and the motors MG1 and MG2 are controlled. This control prevents output of the suppressing vibration torque when the suppressing vibration torque should not be output. This control ensures the output of power, which is based on the torque demand Tr* and is in the range of the input limit Win and the output limit Wout of the battery 50, to the ring gear shaft 32a as the drive shaft while driving.

Figure 8:
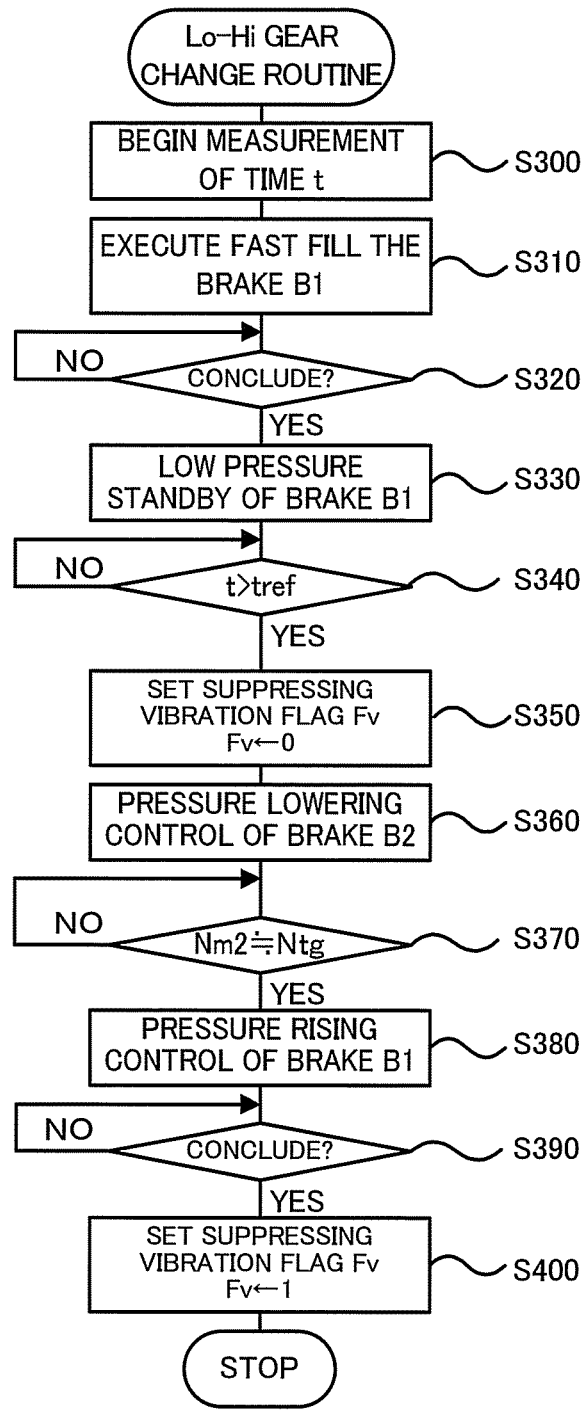
FIG. 8 is a flowchart showing a Lo-Hi gear change control routine.

The following describes the Lo-Hi gear change routine and setting of the suppressing vibration flag Fv. FIG. 8 is a flowchart showing the Lo-Hi gear change control routine in the transmission 60 executed by the hybrid electronic control unit 70 in the embodiment. In the gear change routine, the CPU 72 of the hybrid electronic control unit 70 starts a timer not shown in the figure and begins a measurement of a time t that elapses since the gear change processing is started (step S300) and then executes fast fill as the preparation for engagement of the brake B1 (step S310). The fast fill represents a quick oil supply to the cylinder of the brake B1 until just before the brake B1 is engaged. A concrete procedure of the fast fill actuates the linear solenoid SLB1 for the brake B1 at a duty ratio equal to or close to 100%. On conclusion of the fast fill (step S320), the CPU 72 makes the linear solenoid SLB1 low pressure standby at a duty ratio which is lower than the duty ratio equal to or close to 100% (step S330). Thus the brake B1 is set in a half-engaged state.

After the time t, which has passed since the gear change processing is started, is longer than time tref (for example, 500 msec) demanded by the time the fast fill ends and the hydraulic pressure in the brake B1 reaches a hydraulic pressure of the low pressure standby (step S340), the suppressing vibration flag Fv is set to value 0 assuming that off of the brake B2 is instructed (step S350) and then the CPU executes pressure lowering control, which lowers the hydraulic pressure in the brake B2 by adjusting the duty ratio of the linear solenoid SLB2 in the brake B2 equal to or close to 0% from equal to or close to 100% with the hydraulic pressure in the brake E1 made the low pressure standby (step S360). Thus the brake B2 is released with the brake B1 set in a half-engaged state. The reason to set the suppressing vibration flag Fv to value 0 in the step S350 is described below. While the brake B2 is being released with the brake E1 set in a half-engaged state, the output of the suppressing vibration torque from the motor MG2 may cause the fluctuation of the rotation speed of the motor MG2 due to the incomplete engage of the brakes B1 and B2. Thus the suppressing vibration torque should not be output from the motor MG2 when the off of the brake B2 is instructed.

With the brake B1 set in the half-engaged state and the brake B2 released, after the rotation speed of the motor MG2 is close to a changed rotation speed Ntg calculated based on a rotation speed Nst, which is a rotation speed of the motor MG2 when this routine is begun, a gear ratio GLo in the Lo gear position and a gear ratio Ghi in the Hi gear position according to Equation (9) given below (step S370), the CPU 72 executes pressure rising control which makes the linear solenoid SLB1 at a duty ratio equal to or close to 100% (step S380).

$$Ntg=Nst\cdot Ghi/Glo \quad (8)$$

Thus the brake B1 is completely engaged.

After the pressure rising control (step S390), the CPU 72 sets the suppressing vibration flag Fv to value 1 (step S400) and exits from this routine. The reason to set the suppressing vibration flag Fv to value 1 is described below. After the pressure rising control, the brake B1 is completely engaged and the power from the motor MG2 is transmitted to the drive shaft at a gear ratio after gear change. Thus the output of the suppressing vibration torque from the motor MG2 ensures the suppression of the rotational fluctuation. The combination of the engaged brake B1 and the released brake B2 can thus change the state to the Hi gear position.

Figure 9:
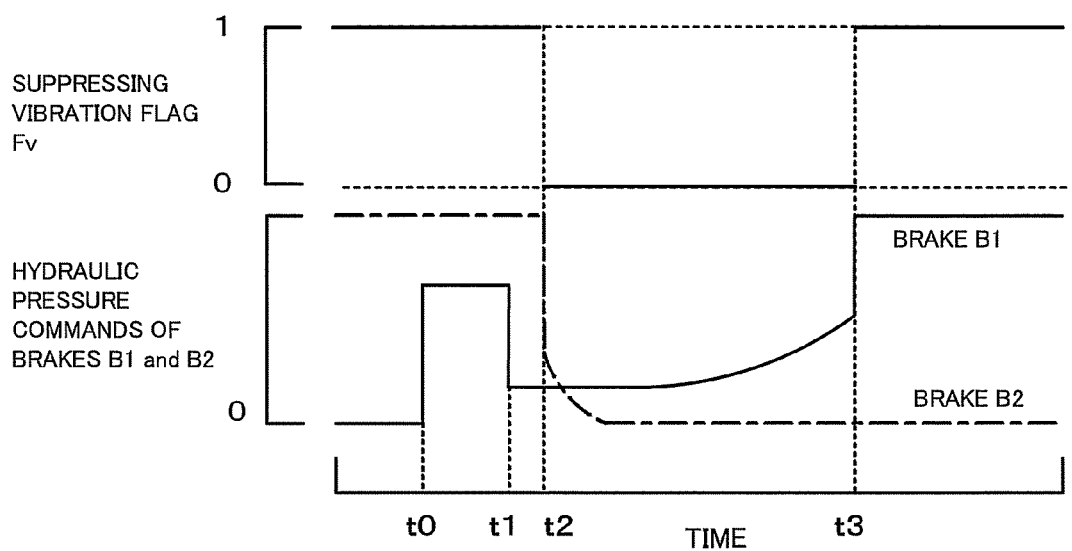
FIG. 9 shows one example of time variations in suppressing vibration flag Fv and hydraulic pressure commands of brakes B1 and B2 during the Lo-Hi gear change.

FIG. 9 shows one example of time variations in the suppressing vibration flag Fv and the hydraulic pressure commands of brakes B1 and B2 during the Lo-Hi gear change. As illustrated, the suppressing vibration flag Fv is set to value 1 as default value and the CPU 72 executes the fast fill to the brake B1 with the suppressing vibration flag Fv set to value 1 when the gear change is instructed (from time t0 to time t1). At time t2 when the time t, which has passed since the gear change is instructed, is longer than preset time tref, the CPU 72 executes pressure lowering control which lowers the hydraulic pressure in the brake B2 and sets the suppressing vibration flag Fv to value 0 assuming that off of the brake B2 is instructed. At time t3 when the rotation speed of the motor MG2 reaches to the rotation speed Nmtg after the gear change, the CPU 72 sets the suppressing vibration flag Fv to value 1. Thus the suppressing vibration flag Fv is set to value 1 from the instruction of the gear change to the off instruction of the brake B2 which is instructed when the fast fill is finished. The suppressing vibration flag Fv is set to value 0 from the off instruction of the brake B2 to the engagement of the brake B1. The suppressing vibration flag Fv is set to value 1 at the time when the brake B2 is engaged. In the drive control routine illustrated in FIG. 4, the CPU 72 sets the torque command Tm2* of the motor MG2 so that the sum of the drive torque based on the torque demand Tr* and the suppressing vibration torque is output from the motor MG2 and controls the engine 22 and the motors MG1 and MG2 in that manner when the suppressing vibration flag Fv is set to value 1 or from the instruction of the gear change to the off instruction of the brake B2 which is instructed when the fast fill is finished. This arrangement ensures the suppression of the rotational fluctuation of the ring gear shaft 32a as the drive shaft and the suppression of the vibration. The CPU 72 sets the torque command Tm2* of the motor MG2 so that the drive torque based on the torque demand Tr* is output from the motor MG2 with disregard to the suppressing vibration torque and controls the engine 22 and the motors MG1 and MG2 in that manner when the suppressing vibration flag Fv is set to value 0 or after the off instruction of the brake B2. This arrangement prevents the motor MG2 from outputting the suppressing vibration torque when the suppressing vibration torque should not be output from the motor MG2.

As described above, the hybrid vehicle 20 of the embodiment sets the torque command Tm2* of the motor MG2 so that the sum of the drive torque based on the torque demand Tr* and the suppressing vibration torque is output from the motor MG2 and controls the engine 22 and the motors MG1 and MG2 in that manner from the instruction of the gear change to the off instruction of the brake B2. This arrangement ensures the suppression of the rotational fluctuation of the ring gear shaft 32a as the drive shaft and the suppression of the vibration. The hybrid vehicle 20 of the embodiment sets the torque command Tm2* of the motor MG2 so that the drive torque based on the torque demand Tr* is output from the motor MG2 with disregard to the suppressing vibration torque and controls the engine 22 and the motors MG1 and MG2 in that manner when the off instruction of the brake 132. This arrangement prevents the motor MG2 from outputting the suppressing vibration torque when the suppressing vibration torque should not be output from the motor MG2. The hybrid vehicle 20 of the embodiment, during changing the change speed step in the transmission, ensures the output of power, which is based on the torque demand Tr* and is in the range of the input limit Win and the output limit Wout of the battery 50, to the ring gear shaft 32a as the drive shaft while driving.

In the hybrid vehicle 20 of the embodiment described above, the torque command Tm2* of the motor MG2 is set so that the drive torque based on the torque demand Tr* is output from the motor MG2 with disregard to the suppressing vibration torque and the engine 22 and the motors MG1 and MG2 are controlled in that manner after the off instruction of the brake B2. Timing of start of the control with disregard to the suppressing vibration torque may be timing after the end of the fast fill, for example, timing at the end of the fast fill.

In the hybrid vehicle 20 of the embodiment described above, the technique of the invention is applied to the control of the Lo-Hi gear change of the transmission 60. The technique of the invention is also applicable to the control of the Hi-Lo gear change.

In the hybrid vehicle 20 of the embodiment described above, the transmission 60 is 2-step transmission or Lo and Hi transmission. The number of steps of the transmission 60 is not restricted to such 2 steps but may be tree steps or more.

Figure 10:
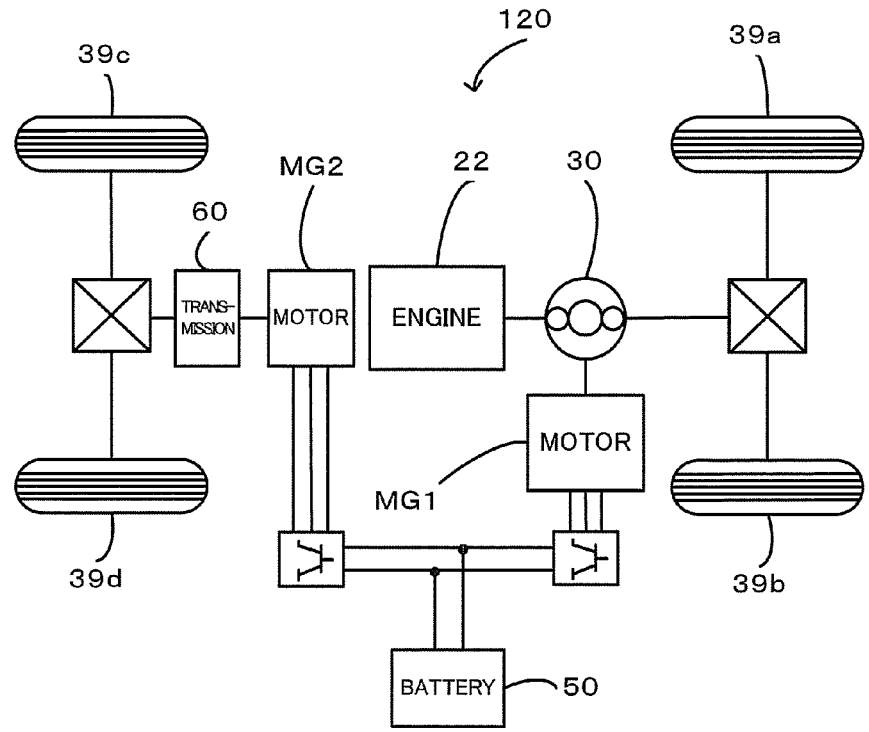
FIG. 10 schematically illustrates the configuration of another hybrid vehicle 120 in one modified example.

In the hybrid vehicle 20 of the embodiment, the power of the motor MG2 is subjected to gear change by the transmission 60 and is output to the ring gear shaft 32a. In one possible modification shown as a hybrid vehicle 120 of FIG. 10, the power of the motor MG2 may be changed gear by the transmission 60 and may be output to another axle (that an axle linked with wheels 39c and 39d), which is different from an axle connected with the ring gear shaft 32a (that is, an axle linked with the wheels 39a and 39b).

Figure 11:
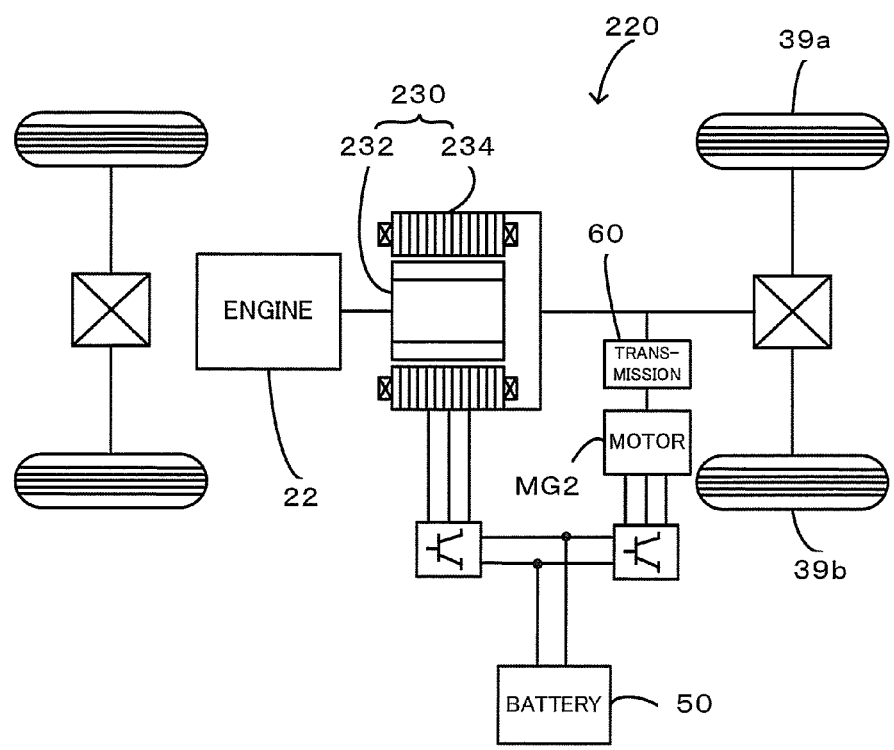
FIG. 11 schematically illustrates the configuration of still another hybrid vehicle 220 in another modified example.

In the hybrid vehicle 20 of the embodiment, the power of the engine 22 is output via the power distribution and integration mechanism 30 to the ring gear shaft 32a functioning as the drive shaft linked with the drive wheels 39a and 39b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39a, 39b and transmits part of the power output from the engine 22 to the drive shaft while converting the residual part of the power into electric power.

The embodiment discussed above regards the technique which is applicable to the hybrid vehicle which includes the engine and the motor. The technique of the invention may be applicable, however, to an electric vehicle which do not include the engine as a power source but includes the motor as the power source and the transmission connected with the rotating shaft of the motor and the drive shaft.

This configuration is, however, not restrictive in any sense, but the technique of the invention may be applicable to vehicles except the automobiles and driving apparatuses. The technique of the invention may also be applicable to a control method of the vehicle and a control method of the driving apparatus.

The primary elements in the embodiment and its modified examples are mapped to the primary constituents of the invention as described below. The motor MG2 in the embodiment is equivalent to the 'motor' of the invention. The transmission 60 having the brakes B1 and B2 engaged or released by the hydraulic circuit 100 in the embodiment is equivalent to the 'change speed transmission mechanism' of the invention. The hybrid electronic control unit 70 executing the procedure of step S110 to set the torque demand Tr* based on the vehicle speed V and the accelerator opening Acc in the gear change drive control routine of FIG. 4 in the embodiment is equivalent to the 'driving force demand setting module' of the invention. The combination of the hybrid electronic control unit 70 executing the procedure of steps S300 to S390 in the Lo-Hi gear change control routine of FIG. 8 and the procedure of steps S150 to S200 in the gear change drive control routine of FIG. 4 with the motor ECU 40 controls the motor MG2 based on the torque command Tm2* in the embodiment is equivalent to the 'controller' of the invention. The procedure of steps S300 to S340 and S360 to S390 in the Lo-Hi gear change control routine of FIG. 8 controls the brakes B1 and B2 of the transmission 60 so that Lo-Hi gear change is executed when the gear change is instructed. The procedure in the Lo-Hi gear change control routine of FIG. 8 sets the suppressing vibration flag Fv to value 1 before a timing when the release of the brake is instructed after the end of the fast fill as the engagement preparation of the brake B1 which enters the engagement state from the released state during the changeover of the change speed step. The procedure of steps S150, S160, and S180 to S200 in the gear change drive control routine of FIG. 4 sets the torque command Tm2* of the motor MG2 so that a sum of the drive torque based on the torque demand Tr* and the suppressing vibration torque in the direction, where the rotational fluctuation of the drive shaft is suppressed, is output from the motor MG2 when the suppressing vibration flag Fv is set to value 1, and sends the set torque command Tm2* to the motor ECU 40. The procedure of step S350 in the Lo-Hi gear change control routine of FIG. 8 sets the suppressing vibration flag Fv to value 0 at the timing when the pressure lowering control of the brake B2 which releases the brake B2 is started executing. The procedure of the steps S170 to S200 in the gear change drive control routine of FIG. 4 sets the torque command Tm2* of the motor MG2 so that the drive torque based on the torque demand Tr* is output from the motor MG2 with disregard the suppressing vibration torque when the suppressing vibration flag Fv is set to value 0, and sends the set torque command Tm2* to the motor ECU 40. The 'motor' is not restricted to the motor MG2 constructed as the synchronous motor generator but may be motor of any other design which is configured to input and output power, for example, induction motor. The 'change speed transmission mechanism' is not restricted to the transmission 60 configured to be able to change speed with two change speed steps, Hi and Lo, but may be any equivalent structure which is connected with a rotating shaft of the motor and with a drive shaft connected with an axle and is configured to change speed and transmit power between the rotating shaft and the drive shaft with a changeover of a change speed step, for example, a transmission changing speed with three or more change speed steps. The 'driving force demand setting module' is not restricted to the module setting the torque demand Tr* based on the vehicle speed V and the accelerator opening Acc but may be any equivalent module setting a torque demand required for driving the vehicle, for example, setting a torque demand only based on the accelerator opening Acc or setting a torque demand only based on a driving position of a predetermined driving route. The 'controller' is not restricted to the combination of the hybrid electronic control unit 70 with the motor ECU 40 but may be composed of one or three electronic control units or more. 'The controller' is not restricted to the module that controls the brakes B1 and B2 of the transmission 60 so that Lo-Hi gear change is executed, sets the suppressing vibration flag Fv to value 1 at or after the end of the fast fill for the brake E1 which enters the engagement state from the released state during the changeover of the change speed step and at or before the timing when the pressure lowering control to the hydraulic pressure in the brake B2 is started, sets the torque command Tm2\* of the motor MG2 so that a sum of the drive torque based on the torque demand Tr* and the suppressing vibration torque in the direction, where the rotational fluctuation of the drive shaft is suppressed, is output from the motor MG2 when the suppressing vibration flag Fv is set to value 1, sends the set torque command Tm2\* to the motor ECU 40, sets the suppressing vibration flag Fv to value 0 at the timing when the release of the brake is instructed, sets the torque command Tm2\* of the motor MG2 so that the drive torque based on the torque demand Tr* is output from the motor MG2 with disregard the suppressing vibration torque when the suppressing vibration flag Fv is set to value 0, and sends the set torque command Tm2\* to the motor ECU 40. The 'controller' may be any equivalent module configured to control the change speed transmission mechanism so as to change the change speed step into an instructed change speed step in response to an instruction to change the change speed step of the change speed transmission mechanism, control the motor so as to output torque equivalent to sum of a drive torque based on the set driving force demand and a suppressing vibration torque applied in a direction for suppressing rotational fluctuation contributing to vibration in the drive shaft at or before preset timing at or after a completion of an engagement preparation of at least one of the plurality of clutches that is to be changed from a release state to an engagement state during changing the change speed step to the instructed change speed step, and control the motor so as to output the drive torque based on the set driving force demand without the suppressing vibration torque after the preset timing. The above mapping of the primary elements in the embodiment and its modified examples to the primary constituents of the invention does not limit the primary constituents of the invention, because the embodiment and its modified examples are examples for concretely describing the best mode for carrying out the invention. More specifically, interpretation of the invention should be performed on the basis of the description of the invention, and the embodiment and its modified examples are only concrete examples of the invention.

Hereinbefore, the embodiments of the present invention have been described with reference to drawings, but the present invention is not limited to the above embodiments. It will be apparent that various modifications can be made to the present invention without departing from the spirit and scope of the present invention.

Industrial Applicability

The technique of the invention is preferably applicable to the manufacturing industries of vehicles and driving apparatuses.

The invention claimed is:

1. A vehicle comprising:
a motor configured to input and output power;
a change speed transmission mechanism connected with a rotating shaft of the motor and with a drive shaft connected with an axle, and configured to change speed and transmit power between the rotating shaft and the drive shaft with a changeover of a change speed step by changing an engagement state of a plurality of hydraulic-driven clutches;
a driving force demand setting module configured to set a driving force demand required for driving the vehicle; and
a controller configured to control the change speed transmission mechanism so as to change the change speed step into an instructed change speed step in response to an instruction to change the change speed step of the change speed transmission mechanism, the controller controlling the motor to not apply a vibration suppression torque after a preset timing during the change speed step, wherein the preset timing is at or after completion of an engagement preparation of at least one of the plurality of clutches from a release state to an engagement state during the change speed step.

2. A vehicle in accordance with claim 1, wherein the preset timing is timing when a release of at least another one of the plurality of clutches, that is changed from the engagement state to the release state during changing the change speed step to the instructed change speed step, is instructed.

3. A driving apparatus driving a drive shaft comprising:
a motor configured to input and output power;
a change speed transmission mechanism connected with a rotating shaft of the motor and with the drive shaft, and configured to change speed and transmit power between the rotating shaft and the drive shaft with a changeover of a change speed step by changing an engagement state of a plurality of hydraulic-driven clutches; and
a controller configured to control the change speed transmission mechanism so as to change the change speed step into an instructed change speed step in response to an instruction to change the change speed step of the change speed transmission mechanism, the controller controlling the motor to not apply a vibration suppression torque after a preset timing during the change speed step, wherein the preset timing is at or after completion of an engagement preparation of at least one of the plurality of clutches from a release state to an engagement state during the change speed step.

4. A control method of a vehicle including a motor
configured to input and output power, and a change speed transmission mechanism connected with a rotating shaft of the motor and with a drive shaft connected with an axle, and configured to change speed and transmit power between the rotating shaft and the drive shaft with a changeover of a change speed step by changing an engagement state of a plurality of hydraulic-driven clutches, the method comprising the steps of:
setting a driving force demand required for driving the vehicle; and controlling the change speed transmission mechanism so as to change the change speed step into an instructed change speed step in response to an instruction to change the change speed step of the change speed transmission mechanism, controlling the motor to not apply a vibration suppression torque after a preset timing during the change speed step, wherein the preset timing is at or after completion of an engagement preparation of at least one of the plurality of clutches from a release state to an engagement state during the change speed step.

5. A control method of a driving apparatus mounted on a vehicle and driving a drive shaft including a motor configured to input and output power, and a change speed transmission mechanism connected with a rotating shaft of the motor and with the drive shaft, and configured to change speed and transmit power between the rotating shaft and the drive shaft with a changeover of a change speed step by changing an engagement state of a plurality of hydraulic-driven clutches, the method comprising the step of:

controlling the change speed transmission mechanism so as to change the change speed step into an instructed change speed step in response to an instruction to change the change speed step of the change speed transmission mechanism, controlling the motor to not apply a vibration suppression torque after a preset timing during the change speed step, wherein the preset timing is at or after completion of an engagement preparation of at least one of the plurality of clutches from a release state to an engagement state during the change speed step.

* * * * *

UNITED STATES PATENT AND TRADEMARK OFFICE
CERTIFICATE OF CORRECTION

PATENT NO. : 8,412,427 B2
APPLICATION NO. : 12/672727
DATED : April 2, 2013
INVENTOR(S) : Kiyoshiro Ueoka et al.

It is certified that error appears in the above-identified patent and that said Letters Patent is hereby corrected as shown below:

In the Specification

In column 1, line 44, change "which is period" to --which is a period--;

In column 1, lines 46-47, change "which is period" to --which is a period--;

In column 2, line 16, change "setting, module" to --setting module--;

In column 10, line 6, change "a oil" to --an oil--;

In column 10, line 13, change "a oil" to --an oil--;

In column 13, line 48, change "ratio p" to --ratio e--;

In column 15, line 59, change "the CPU executes" to --the CPU 72 executes--;

In column 16, line 19, change "Ntg = Nst·Ghi/Glo (8)" to --Ntg = Nst·Ghi/Glo (9)--;

In column 17, line 22, change "the brake 132" to --the brake B2--;

In column 17, line 49, change "be tree steps" to --be three steps--;

In column 19, line 22, change "the brake E1" to --the brake B1--;

Signed and Sealed this
Twenty-second Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,412,427 B2
APPLICATION NO. : 12/672727
DATED : April 2, 2013
INVENTOR(S) : Kiyoshiro Ueoka et al.

It is certified that error appears in the above-identified patent and that said Letters Patent is hereby corrected as shown below:

On the title page, item (73) Assignee:
Delete "Assignee: Toyota Jidosha Kabushiki Kaisha, Toyota-shi (JP)"

and insert therefor --Assignees: Toyota Jidosha Kabushiki Kaisha, Toyota-shi, Aichi-ken (JP); and AISIN AW CO. Ltd., Anjo-shi, Aichi-ken (JP)--.

Signed and Sealed this
Twenty-fifth Day of March, 2014

Michelle K. Lee
*Deputy Director of the United States Patent and Trademark Office*